United States Patent [19]
Castro

[11] Patent Number: 5,085,469
[45] Date of Patent: Feb. 4, 1992

[54] FLEXIBLE COMPOSITE RECORDING MATERIAL FOR FACSIMILE MACHINES

[75] Inventor: Peter D. Castro, New York, N.Y.

[73] Assignee: International Integrated Communications, Ltd., New York, N.Y.

[21] Appl. No.: 612,325

[22] Filed: Nov. 13, 1990

[51] Int. Cl.$^5$ .............................................. B42D 15/00
[52] U.S. Cl. ..................................... 283/94; 283/100; 283/101; 283/105; 283/901; 428/906
[58] Field of Search ...................... 283/67, 72, 85, 91, 283/94, 100, 101, 105, 901; 156/277; 428/906

[56] References Cited

U.S. PATENT DOCUMENTS

| | | | |
|---|---|---|---|
| 2,251,742 | 8/1941 | Kline | 204/2 |
| 2,396,833 | 3/1946 | D'Humy | 462/55 |
| 3,711,353 | 1/1973 | Zimmer | 156/267 |
| 4,303,307 | 12/1981 | Tureck et al. | 283/91 |
| 4,428,997 | 1/1984 | Shulman | 428/202 |
| 4,454,980 | 6/1984 | Poehler | 229/69 |
| 4,522,429 | 6/1985 | Gardner et al. | 283/91 |
| 4,573,409 | 3/1986 | Clar et al. | 101/490 |
| 4,684,563 | 8/1987 | Hayashi et al. | 428/207 |
| 4,824,142 | 4/1989 | Dossche | 462/6 |
| 4,835,028 | 5/1989 | Dey et al. | 428/67 |
| 4,867,481 | 9/1989 | Gundjian | 283/91 |
| 4,896,355 | 1/1990 | Iggulden et al. | 380/54 |
| 4,911,477 | 3/1990 | Shishido | 283/100 |
| 5,001,749 | 3/1991 | Iggulden et al. | 380/18 |

Primary Examiner—P. W. Echols
Assistant Examiner—David P. Bryant

Attorney, Agent, or Firm—Hopgood, Calimafde, Kalil, Blaustein & Judlowe

[57] ABSTRACT

Flexible composite material is provided upon which a facsimile message containing both confidential and non-confidential information can be recorded. In general, the composite material comprises a recording layer and a cover layer. The recording layer has a predetermined width and a longitudinal extent which varies in length consistent with the length of the recorded message. The cover layer is disposed over the recording layer to define a confidential message recording area and at least one non-confidential message recording area. Both message recording areas extend along the longitudinal extent of the recording layer. The cover layer permits recording upon the non-confidential area and confidential area, while concealing the confidential message prior to the cover's removal. Preferably, a releasable adhesive layer is disposed over the confidential message area, so as to releasably secure the cover layer to the recording layer without adversely affecting the integrity or functioning of the confidential recording area. In practice, the adhesive layer is formed as spaced-apart strips and includes perforation lines formed in the cover layer. These perforation lines provide a visual indication that the cover layer had been removed or tampered with. According to another aspect of the present invention there is provided a method of delivering a hard copy of a confidential message. The method involves utilization of a facsimile data communication system including at least one transmitter and at least one receiver operably associated with a recording means capable of utilizing the flexible composite of the present invention.

26 Claims, 9 Drawing Sheets

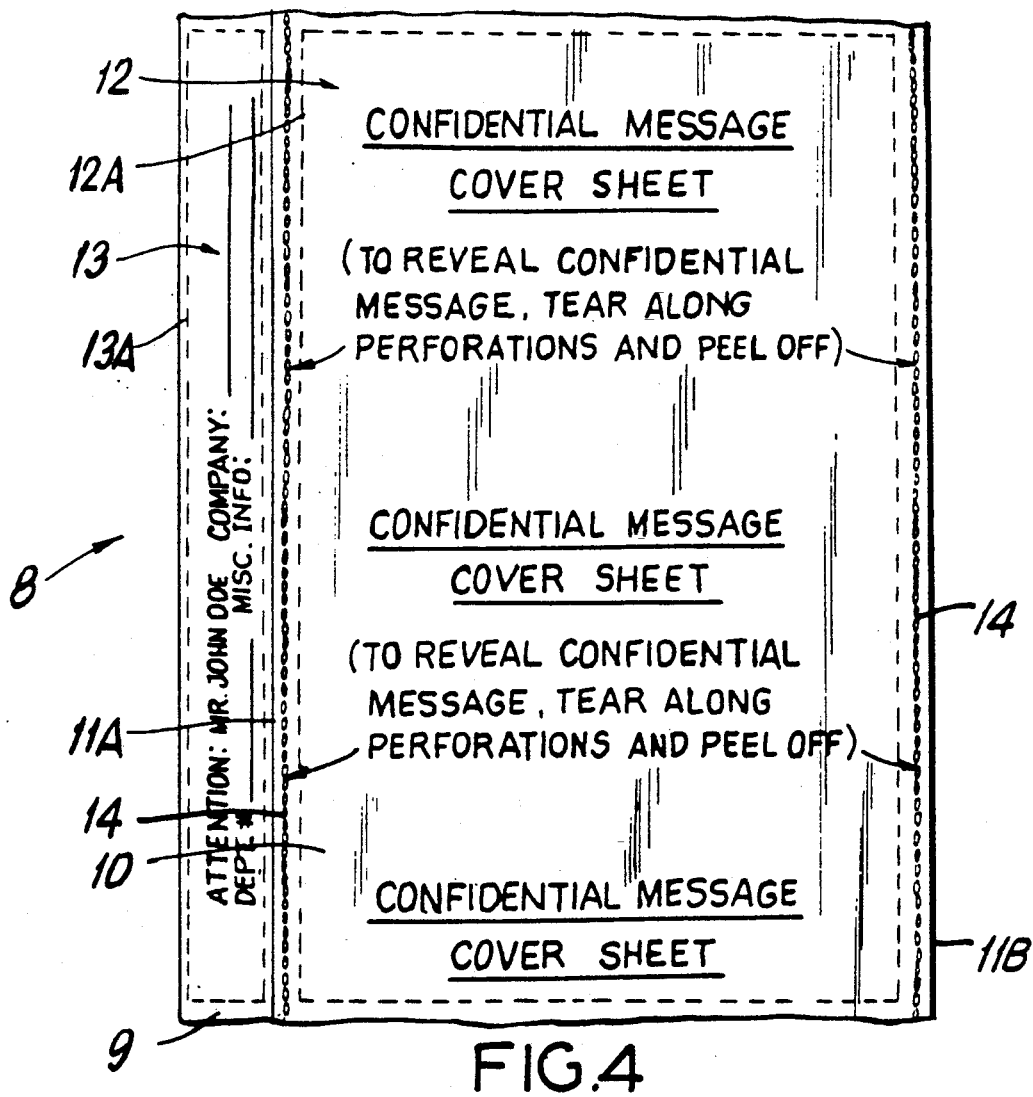
FIG.4
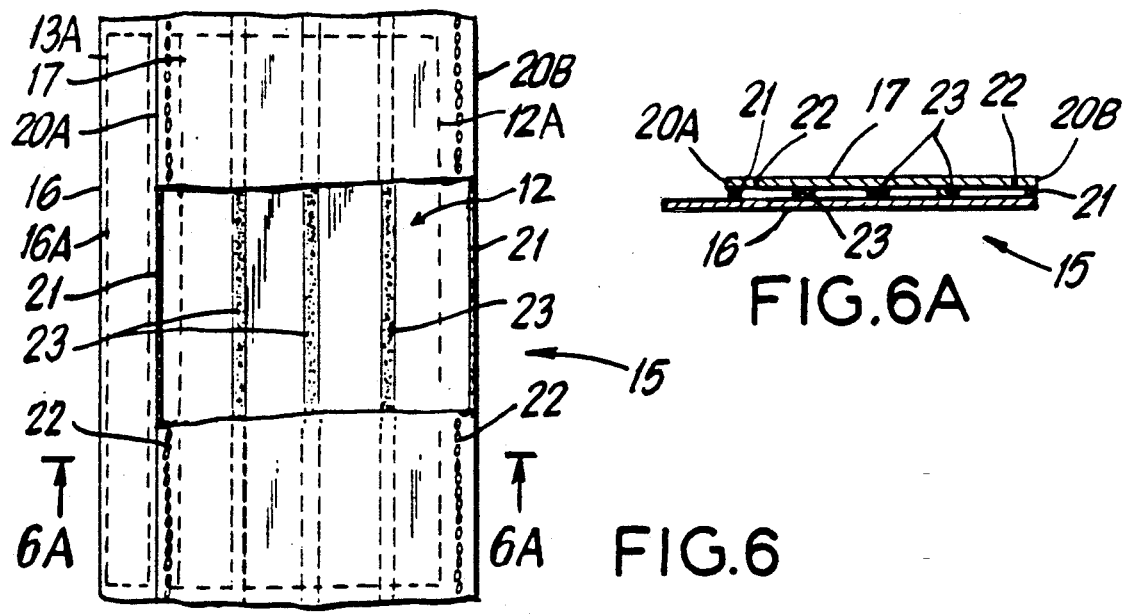
FIG.6
FIG.6A

FLEXIBLE COMPOSITE RECORDING MATERIAL FOR FACSIMILE MACHINES

BACKGROUND OF THE INVENTION

1. Field of Invention

The present invention relates to a method and apparatus for transmitting and delivering a confidential message or document by way of a conventional facsimile data transmission system in a manner which prevents access to the contents without producing visible evidence of tampering.

2. Brief Descriptions of the Prior Art

Over the centuries, written communication has become essential to conducting both business and personal affairs.

As the subject matter of these communications became increasingly private in nature, there arose a problem regarding their confidential transmission. Short of folding, sealing or encapsulating the message in a sealed tube for delivery, the integrity of those involved in the transmission and delivery of the message was relied upon for preserving confidentiality. A natural solution to this problem was provided in large part by the envelope. To date, the envelope, in its numerous embodiments, is the method of choice to ensure confidentiality through the delivery process.

With the advent of telegraphy, telegraphic messages, such as telegrams, an additional technique of message transmission was established. However, the need for preserving confidentiality rendered this communication technique less than desirable. In response to this problem, U.S. Pat. No. 2,396,833 discloses a telegraph receiving blank adapted to conceal the body of the recorded message, thereby preventing unauthorized access during handling and delivery.

In the decades following the developing of the abovementioned telegraph receiving blank, a variety of facsimile machines have been developed which incorporate printers utilizing thermally sensitive paper. Machines of this type are generally adapted to receive and print messages of varying length and thereafter automatically cut the thermally sensitive paper at the end of the message.

As with previous technology involving written communication, present day facsimile machines have not been without concern regarding confidentiality. However, prior art recording blanks of predetermined length have been incapable of safeguarding confidentiality since, unlike prior telegraph equipment, modern day facsimile machines often sever the paper at the end of the recorded message, thereby resulting in documents of varying length. Consequently, the continuous strip of recording blanks proposed in U.S. Pat. No, 2,396,833, cannot be utilized with thermal printing facsimile machines since the severing operation, occurring at arbitrary points along the continuous strip, frequently severs the sealed blank along the message recording area.

Although attempts at securing confidentiality in facsimile transmissions through the use of specialized recording blanks and paper have been unsuccessful to date, alternative techniques do ensure some measure of confidentiality.

U.S. Pat. No. 4,896,355 to Iggulden, et al., discloses one such technique in which a patterning device in conjunction with a photocopy machine is used to produce two partial documents. These partial documents are then transmitted by a facsimile system, and subsequently registered at the receiver to reconstruct the original document. While this technique prevents unauthorized casual reading of each partial document at the transmitter, the received partial documents can be easily registered by unauthorized personnel for document reconstruction without leaving any evidence that unauthorized access had occurred.

Another technique for securing facsimile transmissions has been through the use of facsimile machines having "electronic mailbox" capabilities. In such systems, confidential messages destined for a particular individual are not printed upon receipt, rather they are stored in an assigned electronic mailbox or memory location within the facsimile machine. When the individual desires to read his or her mail, an assigned access or security code is inserted, whereupon the stored message are printed. While this technique can provide a certain degree of confidentiality it requires special equipment and necessitates that the recipient or an authorized agent access it from the facsimile machine.

Thus, while several approaches have been proposed for preventing casual reading of confidential messages, such techniques have suffered from shortcomings and drawbacks of the type described above.

As a result, there remains a need for an alternative approach in delivering hard-copy facsimiles containing confidential information in a manner which prevents casual reading of the contents of the confidential document.

Accordingly, it is a primary object of the present invention to provide a flexible composite material and a method of delivering hard-copies of confidential messages in a manner which overcomes the shortcomings and drawbacks of prior art methodologies and apparatus.

It is a further object of the present invention to provide such flexible composites for use in conjunction with conventional facsimile data systems.

It is a further object of the present invention to provide such a method and composite, in which confidential messages of any length, can be electronically transmitted and subsequently printed as a hard-copy facsimile in a manner which prevents unauthorized access to the contents.

Such a method, in which the hard-copy facsimile is formatted so that a non-confidential portion of the facsimile message is rendered visible, while a confidential message portion is concealed in a manner that would provide visual evidence of tampering.

SUMMARY OF THE INVENTION

According to one aspect of the present invention, there is provided a flexible composite material upon which a facsimile message containing both confidential and non-confidential information can be recorded. In general, the composite comprises a recording layer and a cover layer. The recording layer has a predetermined width and a longitudinal extent which varies in length consistent with the length of the recorded message. The cover layer is disposed over the recording layer to define a confidential message recording area and at least one non-confidential message recording area. Both message recording areas extend along the longitudinal extent of the recording layer. The cover layer permits recording upon the non-confidential area and confidential area, while concealing the confidential message prior to the cover's removal.

In the preferred embodiment, a releasable adhesive layer is disposed over the confidential message area, so as to releasably secure the cover layer to the recording layer without adversely affecting the integrity or functioning of the confidential recording area. In practice, the adhesive layer is formed as spaced-apart strips and includes perforation lines formed in the cover layer. These perforation lines provide a visual indication that the cover layer had been removed or tampered with.

According to another aspect of the present invention there is provided a method of delivering a hard copy of a confidential message. The method involves utilization of a facsimile data communication system including at least one transmitter and at least one receiver operably associated with a recording means capable of utilizing the flexible composite of the present invention.

In general, the method of the present invention involves providing a confidential message from the sender for delivery to the receiver. The method includes formatting the confidential and non-confidential portions of the message within a message formatting space having both confidential and non-confidential format portions, each of which extends along the longitudinal dimension of the message formatting space. In this regard, it is generally noted that the confidential message recording area corresponds substantially to the confidential message formatting space and the non-confidential message recording area corresponds to the non-confidential message formatting space.

After formatting, the message is transmitted and upon receipt, the non-confidential message portion is recorded upon the non-confidential message recording area of the composite recording material of the present invention and the confidential message portion is recorded upon the confidential message recording area. In this manner, the confidential message portion is concealed by the cover layer.

BRIEF DESCRIPTION OF THE DRAWINGS

For a further understanding of the objects of the present invention, the detailed description of the illustrated embodiment is to be taken in connection with the following drawings, in which:

FIG. 4 is a plan view of a first embodiment longitudinally severed sheet of flexible composite recording material in accordance with the present invention;

FIG. 6 is a plan, partially broken away view of a portion of continuously formed composite recording material constructed in accordance with the first embodiment of the present invention;

FIG. 6A is a cross-sectional view of the flexible composite recording material of FIG. 6, taken along line 6A—6A;

DETAILED DESCRIPTION OF THE PREFERRED EMBODIMENTS

Figure 1:
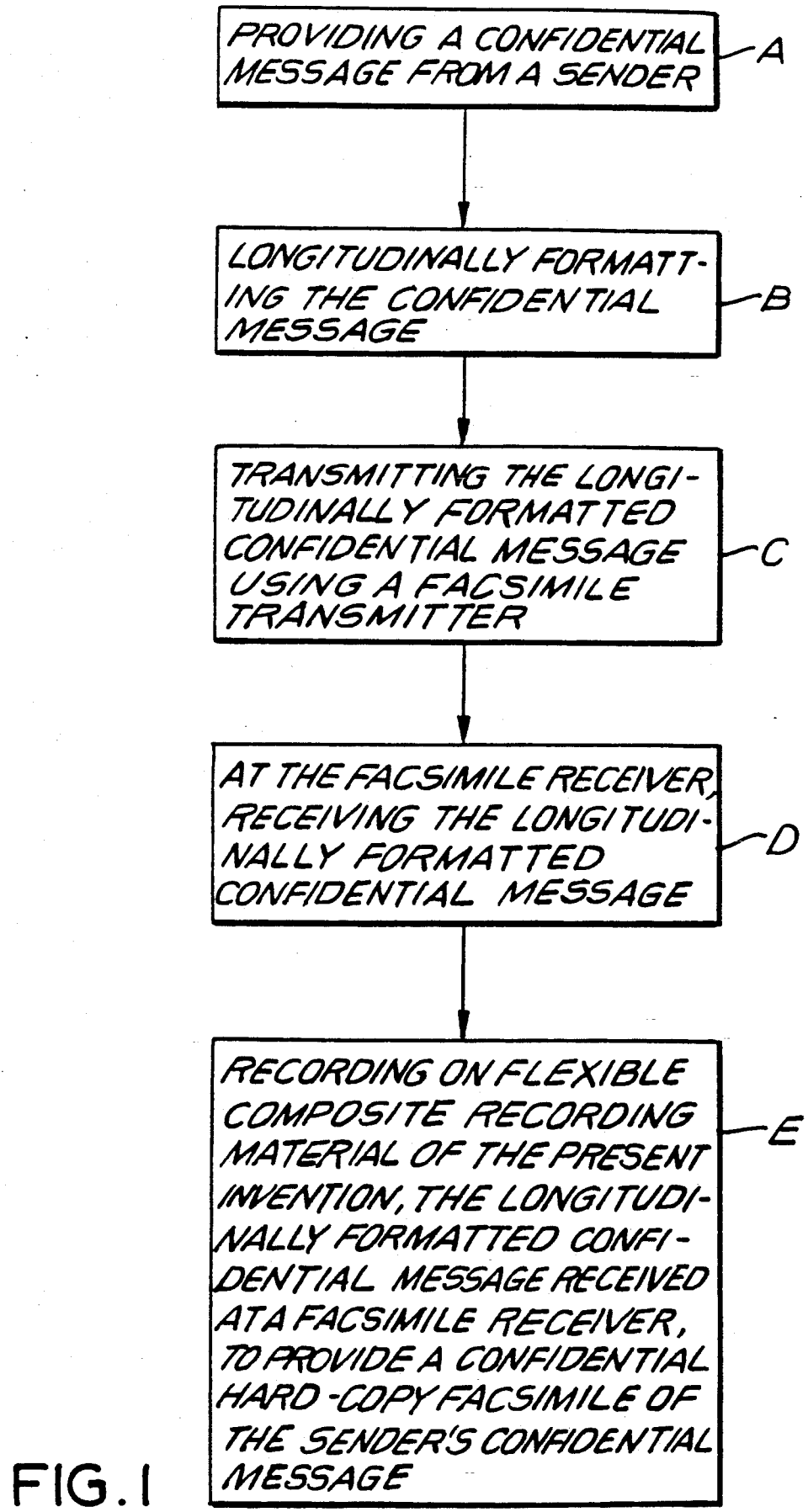
FIG. 1 is a block diagram illustrating the various steps comprising the method of hard-copy confidential message delivery in accordance with the present invention.

Referring now to the drawings wherein like reference numbers designate similar parts through the various views, attention is first directed to FIGS. 1, 2, 3 and 5 wherein the method of delivering a confidential hard-copy facsimile according to the present invention, is described.

Figure 2:
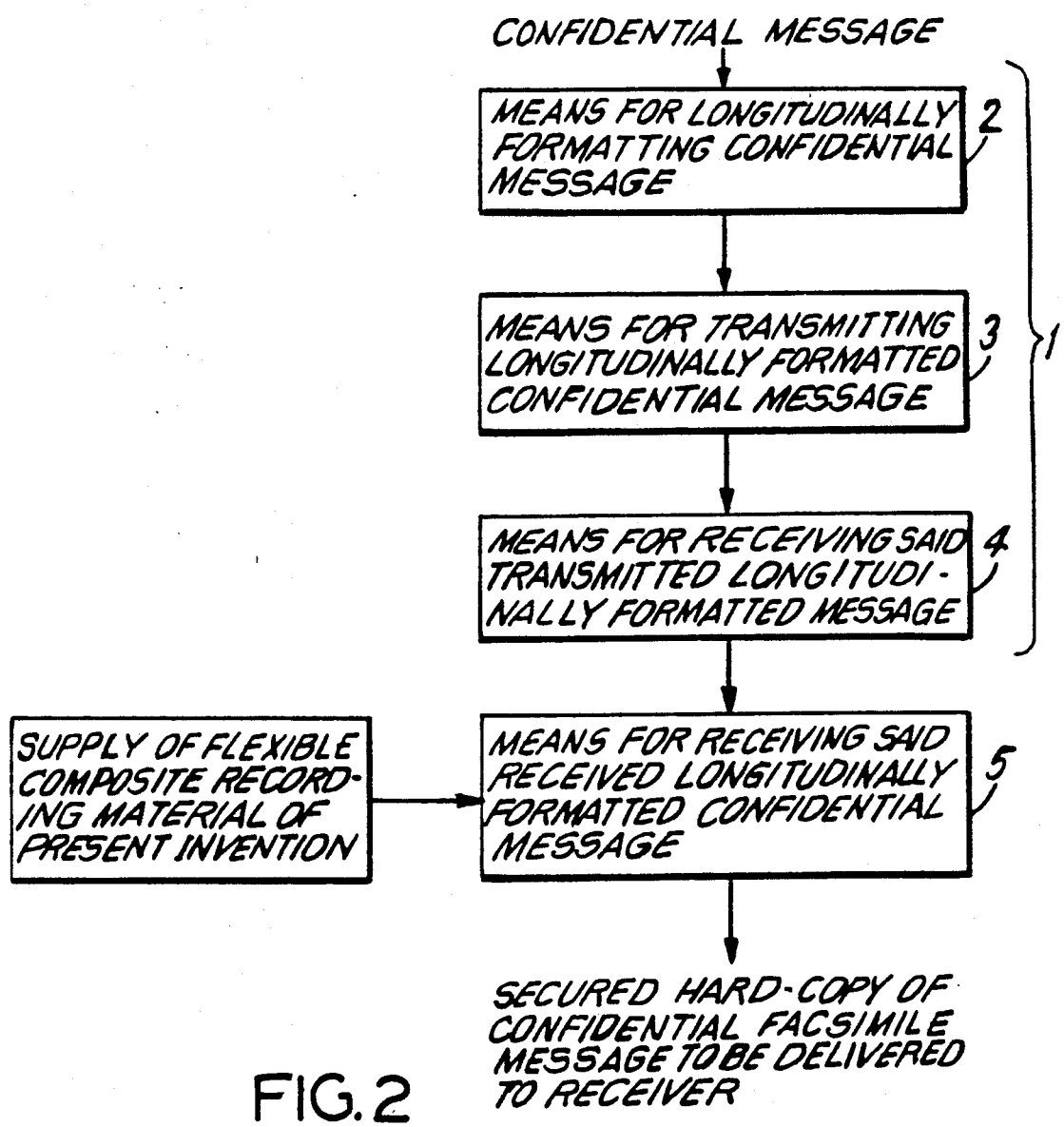
FIG. 2 is a flow chart illustrating the apparatus functions used to carry out the method of hard-copy confidential message delivery in accordance with the present invention.

As illustrated in FIG. 2, the method involves the use of a conventional facsimile data communication system 1 which includes at least one transmitter 3, and at least one receiver 4, both of which are provided with separate transmission, reception and message recording capabilities. It is noted that although the invention is disclosed and discussed in the context of the above-described system, other forms of communication systems can be used. For example, transmitter 3 may be a personal computer provided with a facsimile modem in a manner well known in the art. Similarly, receiver 4 may be a personal computer system equipped with an appropriate modem and external printer.

Similarly, while the facsimile machines utilized by the present invention have been illustrated as having thermal printing mechanisms 5, it is understood that any recording mechanism, known in the art, may be used.

As indicated at block A of FIG. 1, the first step of the method involves producing a confidential message or document, which in general includes a confidential message portion and a non-confidential message portion. As used herein, the term "confidential message portion" encompasses any printed or graphic subject matter which the sender considers private, privileged or confidential and which is intended for the eyes of only the receiver or his authorized agent. The term "non-confidential message portion" includes any item of information which is not considered confidential or privileged and by way of example may include the name or address of the sender or recipient with appropriate delivery instructions. Both the confidential and non-confidential portions of the message can be represented by a physical writing, or electronically in those instances where the message is stored in memory for display by a conventional computer system.

As indicated at Block B of FIG. 1, the next step of the method involves longitudinally formatting the message to ensure that when the message is transmitted and recorded the confidential message portion is concealed while the non-confidential portion will remain visible.

In the preferred embodiment, sheet 8 shown in FIG. 4 can be cut to virtually any length by the facsimile printer; the width of the sheet material 8, however, will remain constant and typically will be the industry standard of 8½ inches. As shown, composite sheet 8 comprises a recording layer 9, over which an optically opaque cover layer 10 is secured at its parallel extending edges 11A and 11B. Cover layer 10 conceals a confidential message recording area 12, bounded generally by boundary line 12A. Recording area 12 extends along the longitudinal dimension of composite sheet 8, its length being determined by the extent of the formatted confidential message received at receiver 4. Recording layer 9 also has a non-confidential message recording area 13, bounded generally by boundary line 13A. As shown, both the confidential and non-confidential recording areas 12 and 13 extend longitudinally along the length of recording layer 9.

Figure 5:
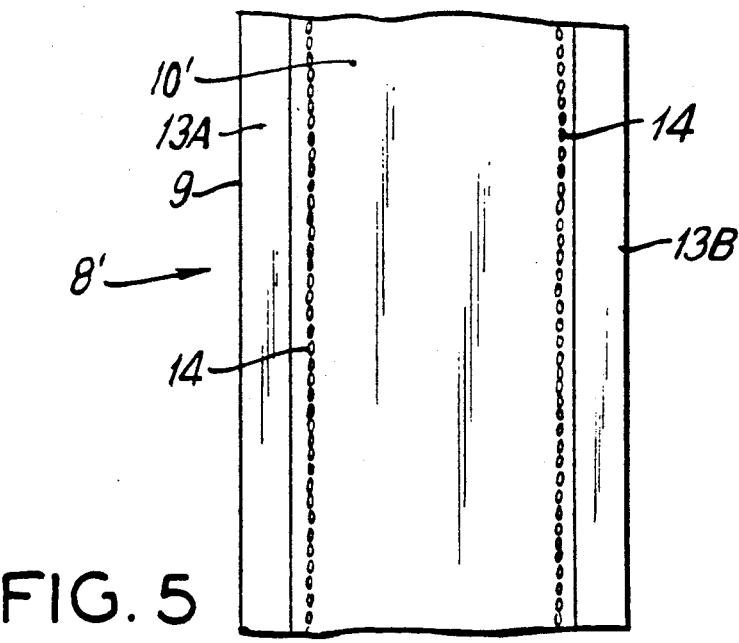
FIG. 5 is a plan view of a second embodiment of severed sheet of composite recording material modified showing non confidential message recording areas on opposing side ends of the cover layer.

In FIG. 5, an alternative embodiment of composite sheet 8 is shown. In composite sheet 8', non-confidential message recording area is split into two recording areas 13A and 13B, each of which extend longitudinally along opposing side edges of cover layer 10. As will be appreciated hereinafter, the advantage of composite material 8' is that it eliminates formatting errors.

Figure 3:
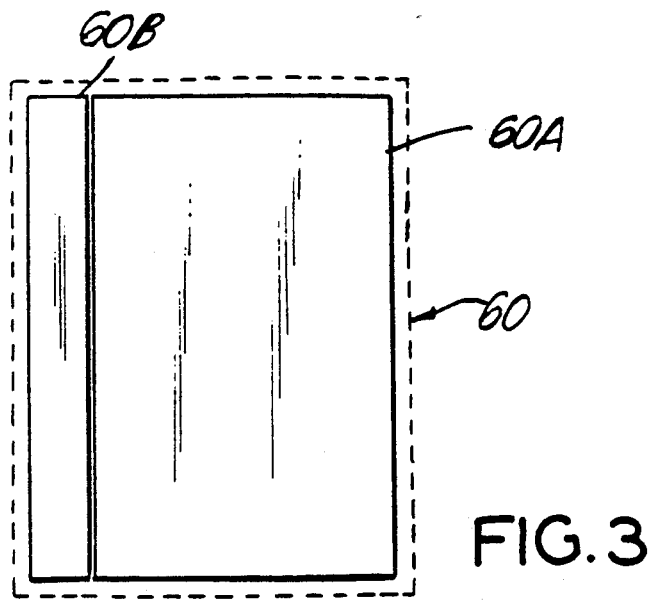
FIG. 3 is a schematic illustration of the message format space used to format the confidential message in accordance with the method of the present invention.

Turning to FIG. 3, the message format space 15 utilized in formatting the confidential message is shown schematically as comprising both a non-confidential space 60B and a confidential space 60A, each space extending longitudinally along the extent of space 60. As with the length of the composite recording material, the longitudinal extent of space 60 typically will vary coincident to the length of the message being formatted, while the width of the formatting space will typically match the width of the composite material and therefore remain constant.

Message formatting space 60 can be represented in one of a variety of mediums, including, for example, a computer display memory, or a physical document. Preferably, the formatting space is programmed into the display memory of a conventional computer system 2 provided with word-processing capabilities. In this way, the confidential and non-confidential formatting spaces 60A and 60B can be visibly delineated using for example, boundary lines shown in FIG. 3. With the imposition of such boundary lines, the extent of each message space is clear and all that the sender need do to assure proper formatting at the transmission end is to assure that the confidential and non-confidential portions of the message are arranged within confidential and non-confidential message formatting spaces 60A and 60B, respectively.

As indicated at blocks C and D of FIG. 1, after longitudinally formatting the confidential message, the message is transmitted. In conventional systems, the transmission and reception process generally involves scanning the confidential message and producing an encoded data stream, transmitting this encoded data stream over the data communication channel, and receiving the transmitted encoded data stream at the receiver's facsimile machine.

As indicated at block E of FIG. I, the received data stream is subsequently stored or utilized immediately to print (i.e., record) a hard-copy facsimile of the transmitted message, using an appropriate length of composite recording material. As discussed above, the composite material is severed at the end of the received transmission printout. The hard-copy facsimile produced at the receiving facsimile machine can be further delivered, if necessary, to the intended receiver who is typically identified in the visible non-confidential recording area 13. When in possession of the intended receiver, the cover layer 10 may be peeled off along perforated lines 14 to reveal the confidential message with the confidence that it has not been previously accessed by unauthorized personnel.

Having described the method of delivering hard-copy facsimiles according to the present invention, it is appropriate at this juncture to describe various embodiments of the composite recording materials, with reference to FIGS. 6 through 10A of the drawings.

In FIGS. 6 and 6A, a portion of continuously formed composite recording material 15 according to the first embodiment, is shown. Composite recording material 15 comprises a thermally sensitive recording layer 16 having a predetermined width (generally about 8.5 inches), and an opaque cover layer 17 having a predetermined width of slightly smaller dimensions (generally about 7.5 inches). Cover layer 17 is sufficiently thermally transmissive (i.e., conductive) to permit thermal printing of a confidential message upon recording area 12 of thermally sensitive layer 16.

As illustrated in FIGS. 6 and 6A, cover layer 17 includes parallel extending side edges 20A and 20B which are secured to recording layer 16 by a non-releasable adhesive 21. Cover layer 17 is further provided with lines of non-reclosable tear perforations 22, located adjacent side edges 20A and 20B, which serve to indicate unauthorized tampering or removal of cover layer 17.

In addition to or in lieu of tear perforations 22, an optically opaque registration pattern can be provided to indicate unauthorized removal of cover layer 17. Preferably, the registration pattern comprises first and second subpatterns disposed spatially coincident on the cover and recording layers, respectively. For example, the first subpattern can be printed upon cover layer 17 adjacent one or both of its opposing side edges 20A and 20B, while the second subpattern is printed on the recording layer. In their untampered state, the two subpatterns coincide to form a predetermined pattern visible upon inspection under a source of intense light. If cover sheet 17 has been tampered with, then the subpattern will no longer spatially coincide to form a new pattern indicative of tampering.

In order to secure cover layer 17 and recording layer 16 without adversely effecting the confidential message, a releasable adhesive layer 23 is disposed over the confidential message recording area 12 and between at least a portion of recording layer 16 and cover layer 17. As illustrated in FIGS. 6 and 6A, adhesive layer 23 forms a predetermined pattern of spaced-apart strips, preferably extending parallel to the opposing side edges of the cover layer.

Figure 7:
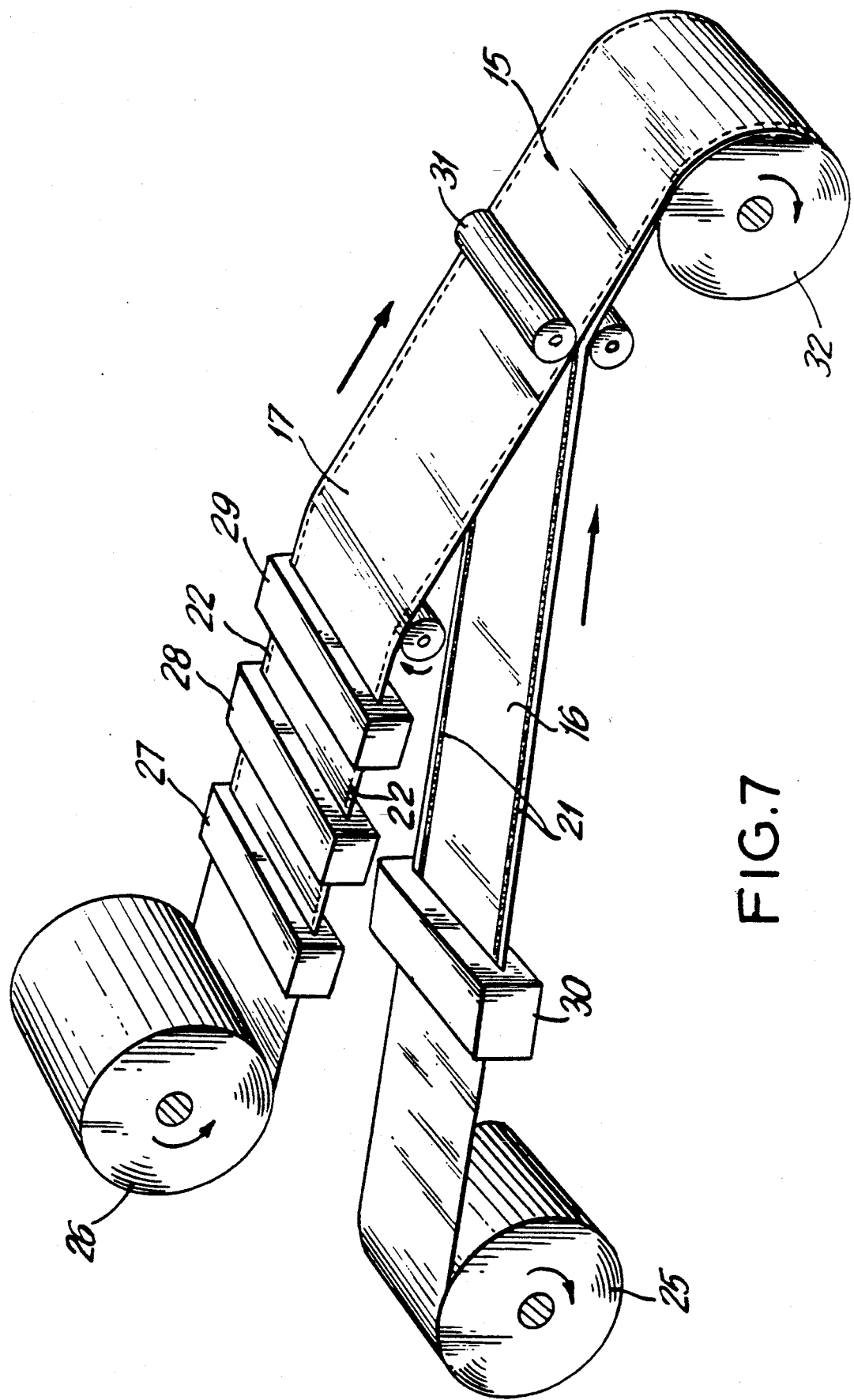
FIG. 7 is a schematic representation of a process utilized in making the flexible composite recording material according to the first embodiment of the present invention.
Figure 7A:
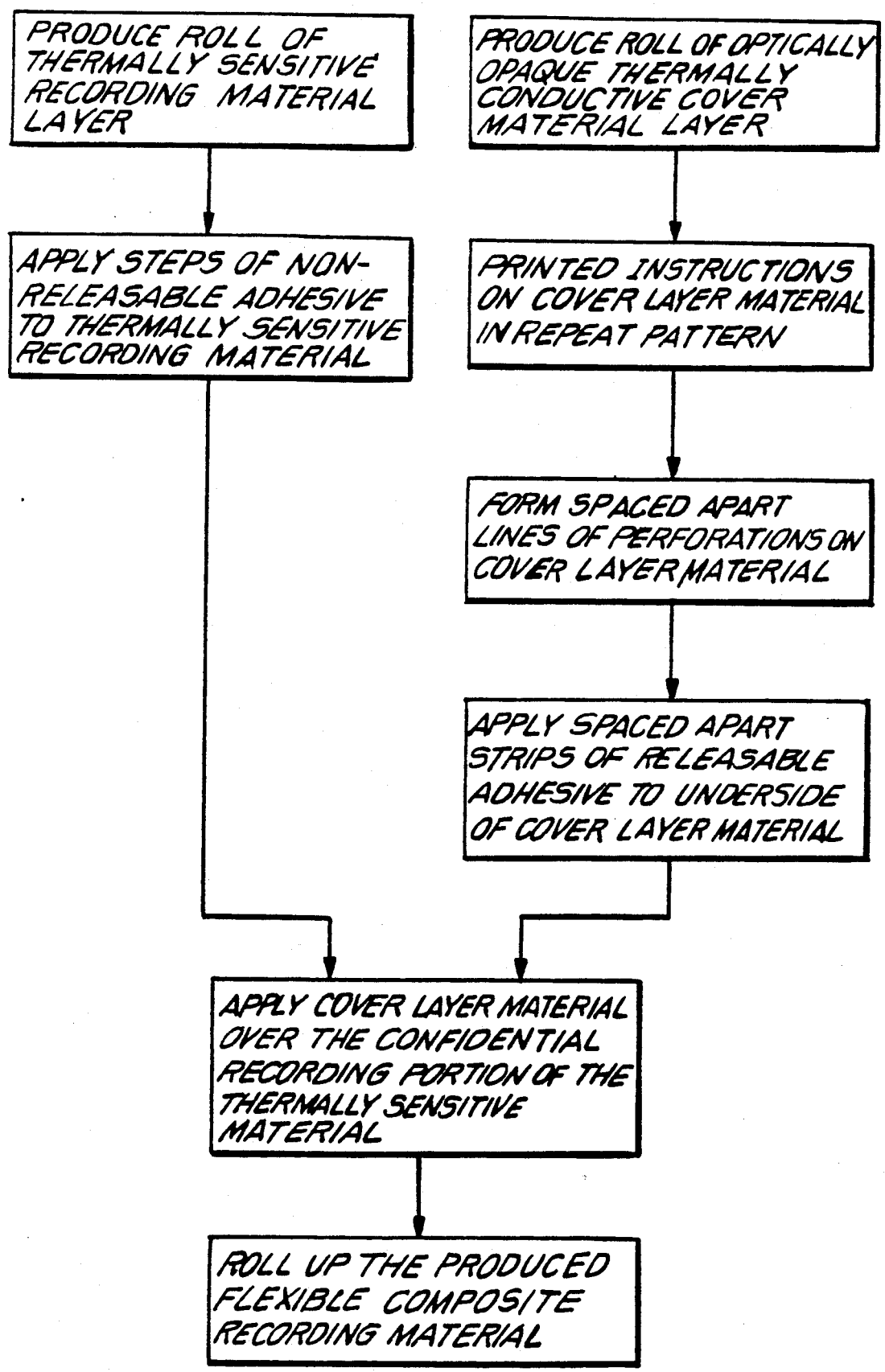
FIG. 7A is a block diagram illustrating a process for manufacturing the first embodiment of the composite recording material illustrated in FIG. 6 and 6A.

In FIGS. 7 and 7A, a process for making continuous rolls of the composite recording material of FIGS. 6 and 6A, is illustrated. The first step includes producing a roll of thermally sensitive recording layer material 25, such as thermal paper, in a conventional manner. The second step involves producing a roll of thermally transmissive, optically opaque cover layer material 26. In order that cover layer material 17 is sufficiently thermally transmissive, metallic or functionally equivalent particles can be dispersed throughout cover layer material 17 during manufacture. Also, the thermal sensitivity of recording layer 16 can be increased so that thermal patterns passing to the recording layer 16, form clear, well-defined messages in the confidential message recording area 12.

Having provided rolls 25 and 26, a number of other processing operations illustrated in FIG. 7A, are subsequently performed along the transport paths of layer materials 16 and 17. In particular, receiver instructions, as shown in FIG. 4 are printed in a repeat pattern on the outer side cover layer 17 at printing station 27; perforation lines 22 are formed in cover layer 17 at perforation station 28; and spaced apart strip-like layers of releasable adhesive 23 are applied to the underside of cover layer 17 at adhesive application station 29. At station 30, along the transport path of thermal recording layer material 16, narrow parallel extending strips 21 of non-releasable (i.e., curable) adhesive are applied to the upper surface of thermal recording layer 16. These processed layers 16 and 17 are then brought into contact in an overlying relationship under pressure and in the presence of UV radiation at station 31, so that cover layer 17 is disposed over the confidential message recording area 12 thereby producing a continuous length of flexible composite recording material 15 which is then rolled up into a roll 32.

Figure 8:
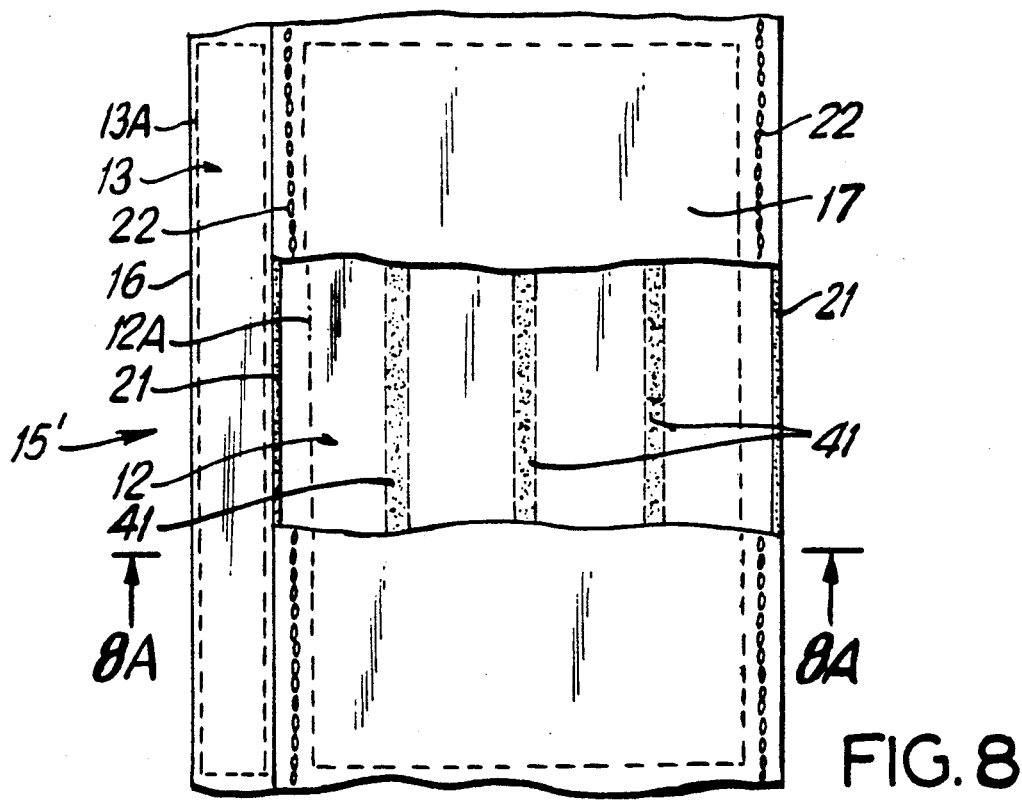
FIG. 8 is a plan, partially broken away view of a portion of continuously formed composite recording material constructed in accordance with the second embodiment of the present invention.
Figure 8A:
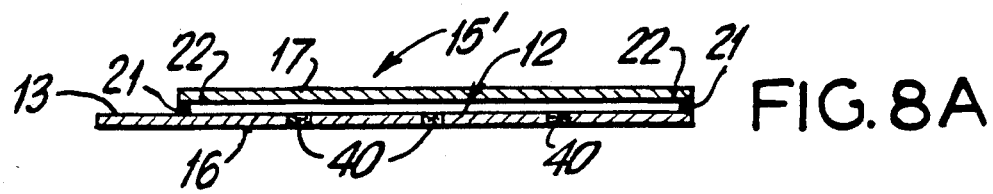
FIG. 8A is a cross-sectional view of the flexible composite recording material of FIG. 8, taken along line 8A—8A.

FIGS. 8 and 8A depict a portion of continuously formed composite recording material 15' according to a second embodiment of the present invention wherein a microencapsulated adhesive 40 is applied to recording layer 16 in a strip-like pattern 41. This microencapsulated adhesive can be applied to the underside portion of cover layer 17 in the form of spaced apart strips or beads, or can be impregnated within either the cover layer 17 or recording layer 16 during the manufacture of the component materials. Preferably, the characteristics of adhesive 40 is such that it quickly cures upon rupture of the microcapsules and does not interfere with the formation of the thermal images on recording layer 16. At the end of facsimile printing operation, when the composite recording material is cut or severed along a line transecting the opposing side edges of cover layer 17, non-releasable adhesive 40 is released from the dispersed microcapsules along portions of the line, thereby sealing cover layer 17 to recording layer 16 along at least a portion of both sides of the severance line.

Figure 9:
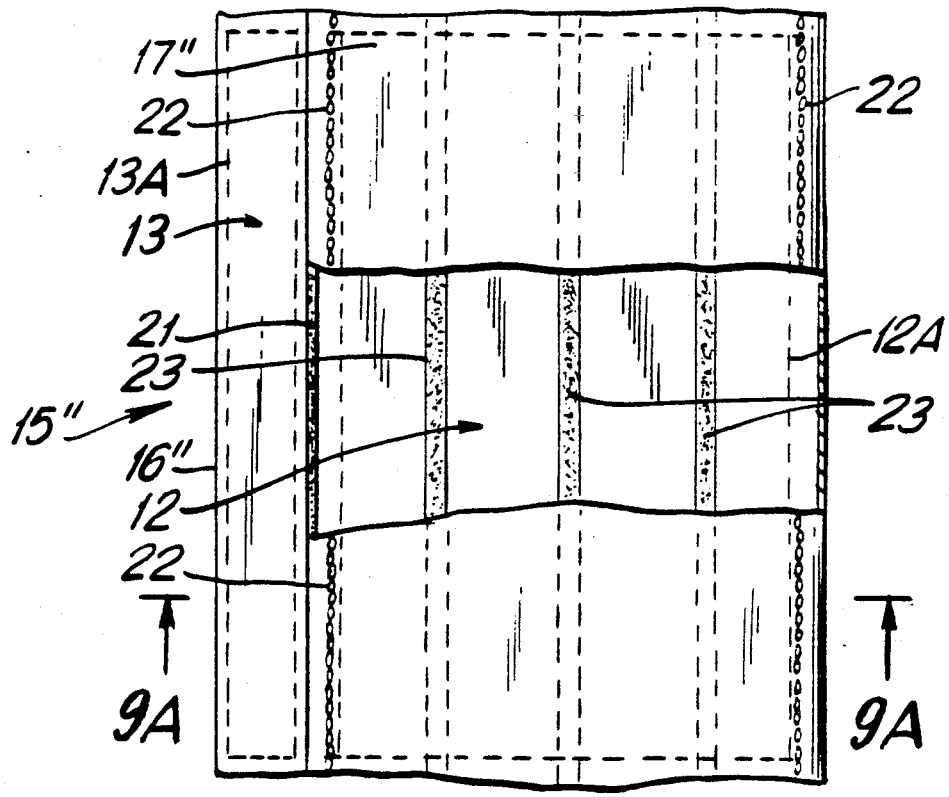
FIG. 9 is a plan, partially broken away view of a portion of continuously formed composite recording material constructed in accordance with the third embodiment of the present invention.
Figure 9A:
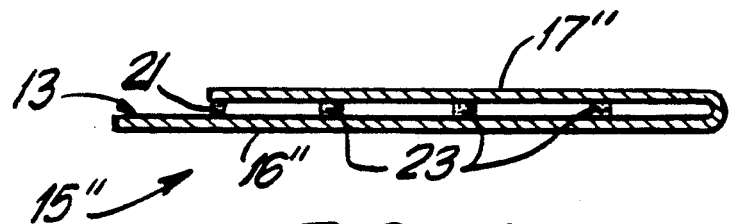
FIG. 9A is a cross-sectional view of the flexible composite recording material of FIG. 9, taken along line 9A—9A.

In FIGS. 9 and 9A, a portion of continuously formed composite recording material 1541 according to the third embodiment of the present invention, is shown. In this embodiment, both the thermally sensitive layer 16" and the cover layer 17" are formed from a single substrate.

Figure 10:
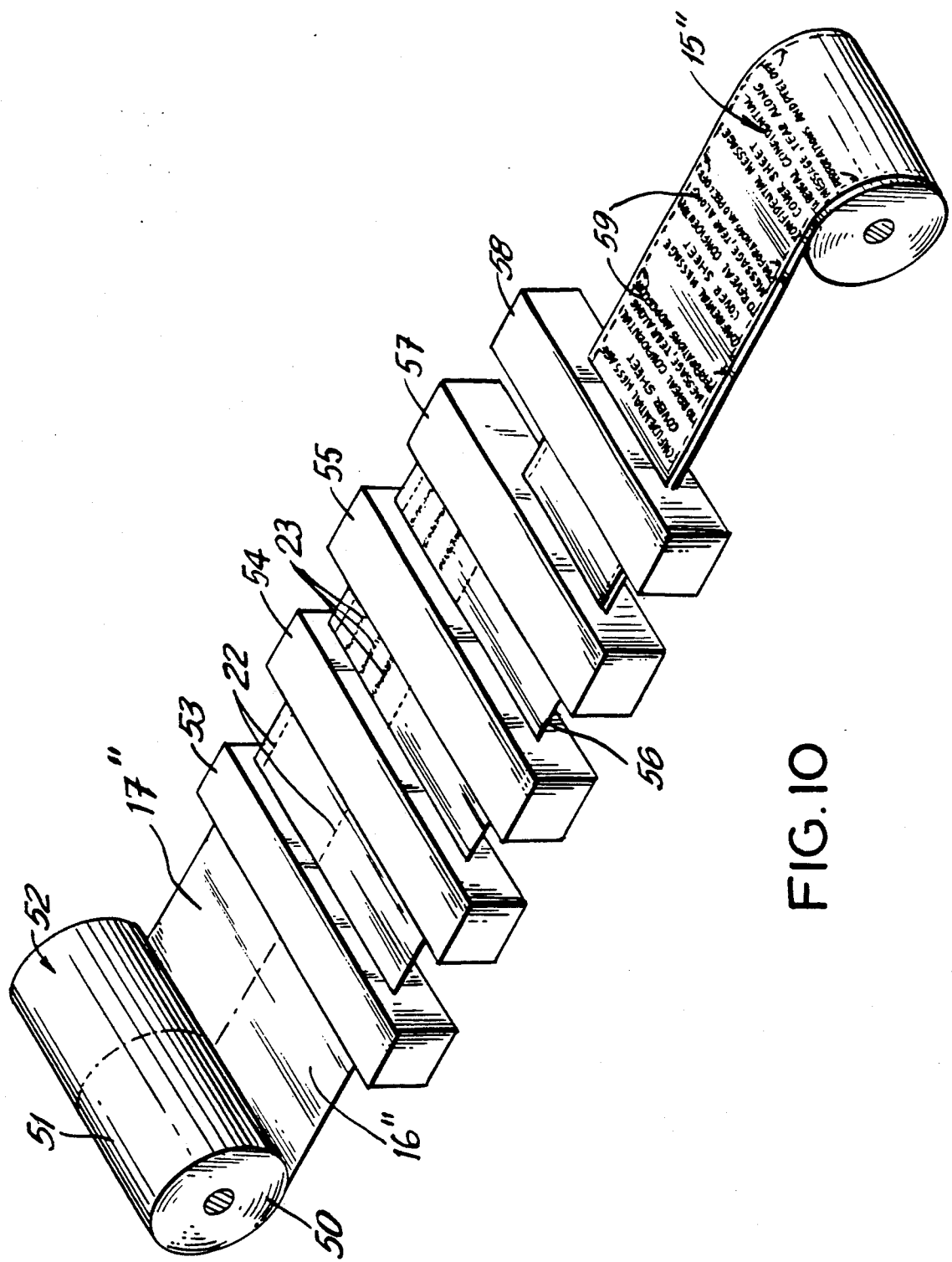
FIG. 10 is a schematic illustration of a process utilized in making the flexible composite recording material according to the third embodiment of the present invention.
Figure 10A:
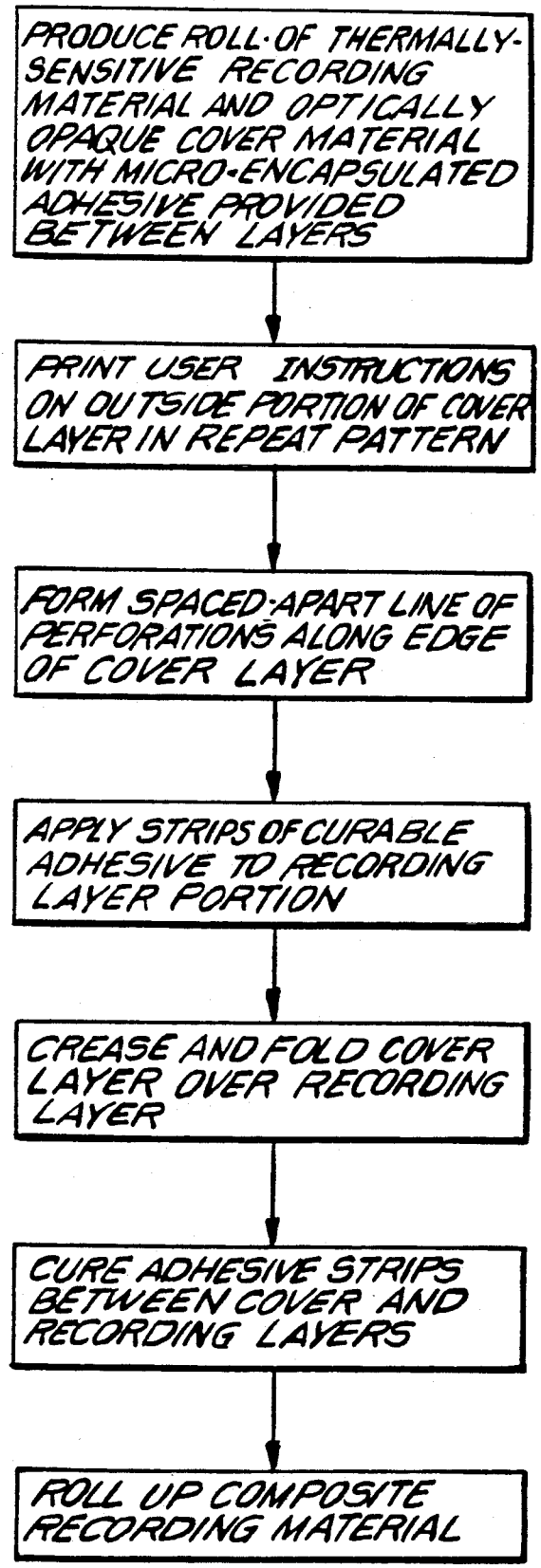
FIG. 10A is a block diagram illustrating a process for manufacturing the fourth embodiment of the composite recording material illustrated in FIGS. 9 and 9A.

In FIGS. 10 and 10A, a process for making the continuous rolls of the composite recording material of FIGS. 9 and 9A is illustrated. The first step included producing a roll of opaque paper 50 having a width of approximately 16.0 inches. A 8.5 inch longitudinal portion 51 is treated with a thermal sensitizing process to premit this portion of the roll to function as thermally sensitive layer material 16". The remaining 7.5 inch portion 52 is left untreated and serves as optically opaque cover layer material 17".

As illustrated in FIG. 10, the above-mentioned selectively treated material is drawn along a pathway, along which various operations are performed. At line perforation station 53, parallel lines of perforations 22, with a spacing of about 7.0 inches are formed along cover layer material portion 17". At releasable-adhesive application station 54, a plurality of spaced-apart strip-like layers of releasable (tack) adhesive 23 are disposed on the upwardly facing surface of cover layer material 16". At non-releasable adhesive application station 55, a narrow strip-like line of non-releasable (curable) adhesive 21 is applied along thermal recording layer material 16" at about 1.1 inches from edge 56. Then with perforation lines 22 formed and adhesive 23 applied, the 7.5 inch cover layer material portion 17" is folded and creased at folding and creasing station 57. At this station, pressure is applied to the cover layer material and UV light to effectuate curing of adhesive line 21. Subsequently, at printing station 58, user instructions 59 are printed upon the cover layer in a repeat pattern. Thereafter composite recording material 15" is rolled for storage and subsequent usage.

Although in the above embodiment, the width of the message format space and message recording area across the composite material were illustrative as being the industry standard of 8.5 inches, it is understood that this width may vary.

While the particular embodiments shown and described above have proven to be useful in many applications in the facsimile transmission and reception art, further modifications of the present invention herein disclosed will occur to persons skilled in the art to which the present invention pertains, and all such modifications are deemed to be within the scope and spirit of the present invention defined by the appended claims.

What is claimed is:

1. Flexible composite material upon which a facsimile message having a confidential and non-confidential message portion, can be recorded, said flexible composite material comprising:

a recording layer upon which one or more facsimile messages can be recorded, said recording layer having a predetermined width and longitudinal extent; and a cover layer disposed over a longitudinally extending portion of said recording layer so as to define a confidential recording area, each said message recording area extending along the entire longitudinal extent of said recording layer, said cover layer permitting recording of said non-confidential message portion upon said non-confidential message recording area and recording of said confidential message portion upon said confidential message recording area, while concealing said confidential message portion until said cover layer is removed from over said confidential message recording area.

2. The flexible composite material of claim 1, wherein a releasable adhesive layer is disposed over said confidential message recording area and between at least a portion of said recording layer and said cover layer, to releasably secure said cover layer and said recording layer in such a manner that said cover layer can be removed from said recording layer without adversely affecting said confidential message portion recorded in said confidential message recording area.

3. The flexible composite material of claim 2, wherein said cover layer has opposing parallel extending side edges and said cover layer and said recording layer are secured to each other along said opposing side edges of said cover layer.

4. The flexible composite material of claim 3, wherein said recording layer and said cover layer are secured along said opposing side edges of said cover layer by a non-releasable adhesive applied between said recording layer and said opposing side edges of said cover layer.

5. The flexible composite material of claim 4, which further comprises perforations formed through said cover layer, adjacent at least of said opposing side edges so as to indicate tampering of said cover layer by unauthorized personnel and to facilitate authorized removal of said cover layer from over said confidential message area.

6. The flexible composite material of claim 5, wherein id releasable adhesive layer comprises a predetermined pattern disposed over said confidential message area and between at least a portion of said recording layer and said cover layer.

7. The flexible composite material of claim 6, wherein said predetermined pattern comprises one or more spaced apart strips extending parallel to said opposing side edges of said cover layer.

8. The flexible composite material of claim 7, which is provided in continuous form and is rolled up and stored in a roll configuration for subsequent dispensing and severing in variable lengths along said longitudinal extent.

9. The flexible composite material of claim 2, which further comprises a registration pattern having first and second component subpatterns disposed on said cover layer and said recording layer.

10. The flexible composite material of claim 2, wherein said recording layer comprises a thermally sensitive layer upon which said facsimile message can be thermally recorded, and wherein said cover layer is sufficiently thermally transmissive so as to permit thermal printing of said confidential message portion of said facsimile message upon said confidential message recording area.

11. The flexible composite material of claim 10, wherein said cover layer has opposing side edges, and said thermally sensitive layer and said cover layer are secured along said opposing side edges of said cover layer.

12. The flexible composite material of claim 11, wherein said thermally sensitive layer and said cover layer are secured along said opposing side edges by a non-releasable adhesive applied between said thermally sensitive layer and said opposing side edges of said cover layer.

13. The flexible composite material of claim 12, which further comprises perforations formed through said cover layer, adjacent at least one of said opposing side edges so as to permit indication of tampering of said cover layer by unauthorized personnel and to facilitate authorized removal of said cover layer from over said confidential recording message area.

14. The flexible composite material of claim I3, wherein said releasable adhesive layer is disposed in a predetermined pattern over said confidential message area and between at least a portion of said thermally sensitive layer and said cover layer.

15. The flexible composite material of claim 14, wherein said predetermined pattern comprises one or more spaced apart strips extending parallel to said opposing side edges of said cover layer.

16. The flexible composite material of claim 15, which is provided in a continuous form and is rolled up and stored in a roll configuration for subsequent dispensing and severing in variable lengths along said longitudinal extent.

17. Flexible composite material upon which facsimile messages each having a confidential and non-confidential message portion can be thermally printed, said flexible composite material comprising:

a thermally sensitive layer upon which a facsimile message can be thermally printed, said thermally sensitive layer having a predetermined width and a longitudinal extent; and a cover layer disposed over a longitudinally extending portion of said thermally sensitive layer so as to define on said thermally sensitive layer a confidential message recording each said message recording area extending along the entire longitudinal extent of said thermally sensitive layer, said permit thermal printing of said confidential message portion upon said confidential message recording area and said non-confidential message portion upon said non-confidential message recording area, said cover layer being optically opaque so as to prevent visible perception of said confidential message portion in said confidential message recording area until said cover layer is removed from over said confidential message recording area.

18. The flexible material of claim 17, wherein said facsimile message can be thermally printed upon said thermally sensitive layer by selective application of a heat pattern corresponding to said facsimile message, and said cover layer is sufficiently thermally transmissive so as to permit passage of said heat pattern corresponding to said confidential message portion, to said confidential message recording area and cause thermal printing of said facsimile message thereupon.

19. The flexible composite material of claim 17, wherein said cover layer has opposing parallel extending side edges and said thermally sensitive layer and said cover layer are secured along said opposing side edges of said cover layer, by non-releasable adhesive applied between said thermally sensitive layer and said opposing side edges of said cover layer.

20. The flexible composite material of claim 19, wherein said cover layer and said thermally sensitive layer are secured by continuous transition of said thermally sensitive layer into said cover layer along one said opposing side edge, and by an adhesive applied between said thermally sensitive layer and the other opposing side edge of said cover layer.

21. The flexible composite material of claim 19, wherein said flexible material has a predetermined length and width dimension and is rolled up and stored in a roll configuration for subsequent dispensing and severing in variable lengths along said longitudinal extent.

22. The flexible composite material of claim 19, wherein said cover layer and said thermally sensitive layer are secured by non-releasable adhesive applied between said thermally sensitive layer and said opposing side edges of said cover layer.

23. The flexible composite material of claim 22, which further comprises perforations formed through said cover layer, adjacent at least one of said opposing side edges, so as to facilitate removal of said cover layer from over said confidential message portion of said thermally sensitive layer.

24. The flexible composite material of claim 19, wherein at least a portion of said cover layer contains microencapsulated adhesive so that when said flexible composite material is cut along a line transacting said opposing side edges, said adhesive is released along at least a portion of said line so as to secure said cover layer and said thermally sensitive layer along at least a portion of both sides of said line.

25. The flexible composite material of claim 24, wherein said portion of cover layer comprises a predetermined pattern containing microencapsulated adhesive.

26. The flexible composite material of claim 25, wherein said predetermined pattern of microencapsulated adhesive comprises one or more spaced apart strips extending parallel to said opposing side edges.

* * * * *